United States Patent [19]

Hnizdor

[11] Patent Number: 5,628,140
[45] Date of Patent: *May 13, 1997

[54] KEELING BEND FLY HOOK

[76] Inventor: Thomas A. Hnizdor, 9164 Brady, Redford, Mich. 48239

[*] Notice: The term of this patent shall not extend beyond the expiration date of Pat. No. 5,440,832.

[21] Appl. No.: 420,479

[22] Filed: Apr. 12, 1995

[51] Int. Cl.$^6$ .............................. A01K 83/00; A01K 85/08
[52] U.S. Cl. ........................................ 43/43.16; 43/42.25
[58] Field of Search ........................... 43/42.32, 42.33, 43/42.25, 42.27, 43.16, 44.2

[56] References Cited

U.S. PATENT DOCUMENTS

| | | | |
|---|---|---|---|
| 14,377 | 10/1856 | Cox | 43/42.27 |
| 882,882 | 3/1908 | Henzel | 43/44.82 |
| 1,283,718 | 11/1918 | Ford | 43/44.82 |
| 1,430,626 | 10/1922 | Christensen | 43/43.16 |
| 1,635,644 | 7/1927 | Sloan | 43/42.25 |
| 1,875,182 | 8/1932 | Southwell | 43/44.82 |
| 1,961,378 | 6/1934 | Mitchell | 43/44.2 |
| 2,178,301 | 10/1939 | Grant | 43/42.25 |
| 2,233,863 | 3/1941 | Driscoll | 43/43.16 |
| 2,534,469 | 12/1950 | Moore | 43/44.82 |
| 2,800,740 | 7/1957 | Glaze | 43/44.82 |
| 3,023,536 | 3/1962 | Williams | 43/43.2 |
| 3,367,060 | 2/1968 | Abercrombie | 43/42.33 |
| 3,605,317 | 9/1971 | Pobst | 43/42.25 |
| 4,163,337 | 8/1979 | Kress | 43/42.05 |
| 4,280,296 | 7/1981 | Volenec | 43/44.81 |
| 4,380,884 | 4/1983 | Pond | 43/42.09 |
| 4,559,736 | 12/1985 | Sienkiewicz | 43/42.25 |
| 4,835,898 | 6/1989 | Pond | 43/43.16 |
| 4,914,852 | 4/1990 | Hnizdor | 43/44.82 |
| 4,965,957 | 10/1990 | Hnizdor | 43/44.82 |
| 5,097,621 | 3/1992 | Hnizdor | 43/42.32 |
| 5,394,637 | 3/1995 | Hnizdor | 43/43.16 |

OTHER PUBLICATIONS

VMC Fish Hooks Brochure.
A History of the Fish Hook, Hans JÅrgen Hurum, pp. 70–82.
A Look at Hooks, Lefty Kreh, pp. 44–81.
Hook pp. 459–470 & 509, McClane's New Standard Fishing Encyclopedia & International Angling Guide, vol. 2 (1974).
Mustad Fish Hook Catalog No. 0692, pp. 2–3, 1992.

Primary Examiner—Jeanne Elpel
Attorney, Agent, or Firm—Young & Basile, PC

[57] ABSTRACT

A fly hook includes a shank with first and second ends. A first end portion of a keel bend extends from the second end of the shank at a predetermined angle from the axis of the shank to place an intermediate portion of bend to one side of axis of shank. A second end portion of the bend terminates in a rolled-out point which is bent away from the shank. The outer edge of the point is co-radially disposed with the first end portion of the bend. The barb is disposed opposite from the outer edge of the point and faces the shank. A hollow flexible body is secured at opposite ends to the shank and has a rigid V-shaped insert disposed therein. The insert has a shape to expand the body to an overall shape simulating a natural bait fish. The body and rigid insert extend from the shank in the same direction as the first end portion and the intermediate portion of the bend.

13 Claims, 1 Drawing Sheet

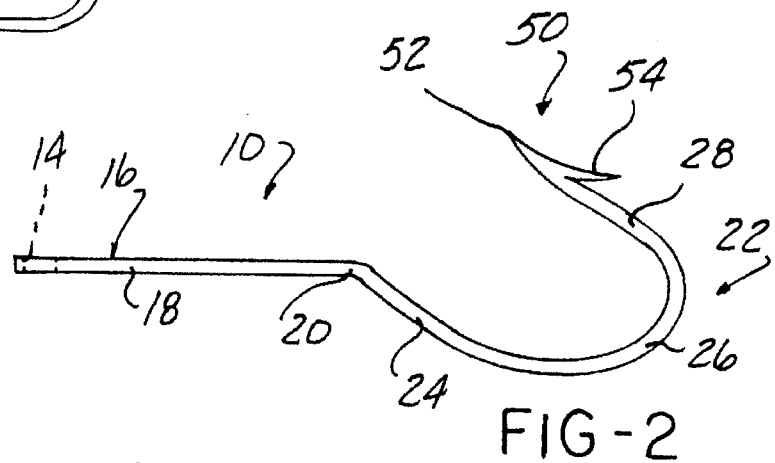
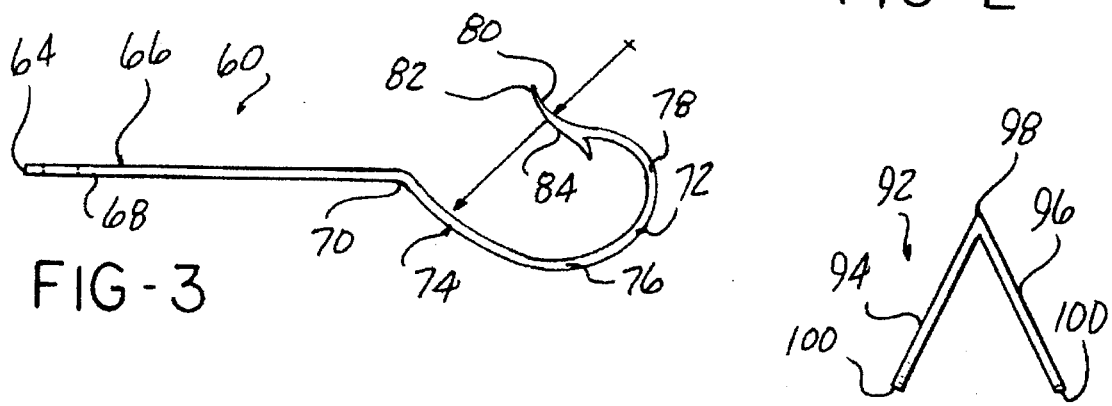
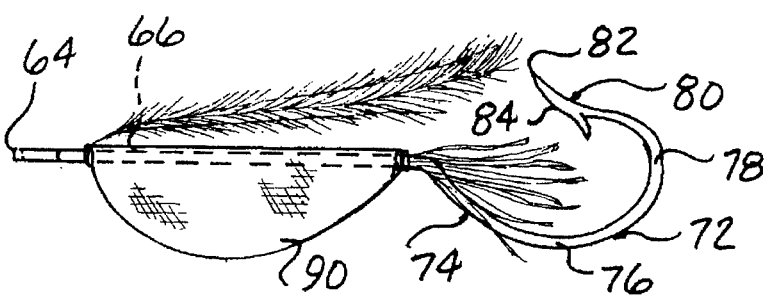
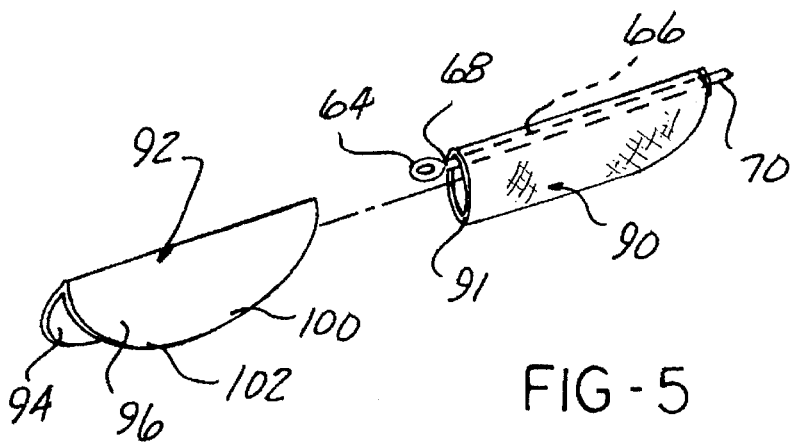

KEELING BEND FLY HOOK

CROSS REFERENCE TO RELATED APPLICATION

This application discloses subject matter similar to that disclosed in pending U.S. Pat. application Ser. No. 08/138,147 filed on Oct. 15, 1993 in the name of Thomas A. Hnizdor and entitled "KEELING BEND FLY HOOK" now U.S. Pat. No. 5,440,832 issued Aug. 15, 1995.

BACKGROUND OF THE INVENTION

1. Field of the Invention

The present invention relates, in general, to fishhooks and, more particularly, to fly hooks.

2. Description of the Art

Hundreds of fishhooks of many different sizes and shapes have been devised for specific purposes. Hook shape can vary in a number of different features or parts including, gap size, point type, bend shape and bend offset, to name a few, depending upon the type of fish being sought, fishing conditions, or the type of fishing, i.e., bait or fly fishing.

Bait hooks with a rolled-in point wherein the point is bent toward the shank have been recognized as being without peer for bait fishing, McClane's NEW STANDARD FISHING ENCYCLOPEDIA, and INTERNATIONAL ANGLING GUIDE, second edition (1974) page 469. This is probably due to the increased bait retention provided by such a hook shape. However, such rolled-in points have not previously been used on fly hooks since a slight bent out point is considered to be desirable for small flies, see McClane's, page 469, supra. Indeed, a catalog of fishhooks provided by Mustad, a major fishhook manufacturer, is completely devoid of any rolled-in point on a hook devised specifically for fly fishing.

Fly hooks have a tendency to ride hook point down in the water with the hook point located below the shank due to the weight of the bend and point portion of the hook. A large number of fishing flies have a floatation member mounted on the shank of the hook. This floatation member also causes the hook to ride in a downward facing position below the shank when the hook is cast into the water or drawn toward the fisherman. Such a hook down position makes hooking fish that have downward facing mouths quite difficult. Thus, many anglers, and in particular, salt water anglers, would prefer the flies to ride in a hook up position.

Keel hooks, as shown in FIG. 1, have a step shank with a straight point which is parallel to the shank. Such keel hooks are usually snagless since the point rides upward due to the weight of the keel or bend portion of the shank. However, such keel hooks have a relatively short shank due to the step which places a major portion of the length of the shank in the keel portion of the hook. Present day keel hooks teach the use of heavy, or weighted materials on the step shank portion of the hook to cause the hook to invert and ride in a point up position, as taught by McClane's, page 509, supra. However, any floatation or buoyant material mounted on the step shank of a present day keel hook would cause the bend and shank portion of the hook to be heavier than the floating portion of the fly thereby revolving the body until the heaviest portions are in the lowermost position. This places the hook in the undesired downward position.

In order to provide the more desirable hook point up feature, fly tiers and fly anglers have been known to tie lead eyes below the shank of the hook with the hook in a point up position. Gravity causes the lead eyes to invert the hook to a desired point up position when fishing. Other fly materials consisting of a body and wings are tied on the top of the hook shank with the bulk of such materials helping to turn the fly over to the hook point up position. While tying a fly in this manner is an effective means of making the fly ride in a hook point up orientation, the additional materials create an undesirable affect due to the weight which becomes more evident when fly casting. The less a fly weighs, the better it is for casting. Adding lead eyes to the fly makes the fly dangerous and uncomfortable to cast and, further, causes the fly to be cumbersome at the generation of the backcast.

Many salt water flies are tied in tandem with two spaced hooks interconnected by a steel cable extending from the end of the shank of one hook to the beginning of the shank of the second or rearmost hook. The frontmost hook is generally one size larger than the rear hook and, being much heavier and larger than the rear hook, acts as a keel to turn the fly over in the water when the rear hook is joined in the point up position to the front hook.

Thus, it would be desirable to provide a fly hook which rides point up when drawn through the water. It would also be desirable to provide a fly hook which easily accepts an attractor body simulating a shad. Finally, it would be desirable to provide a fly hook having the above-described features which provides excellent fish hooking penetration and retention capabilities.

SUMMARY OF THE INVENTION

The present invention is a fly fishing hook which includes unique features previously unknown in fly hooks. The fly hook includes a shank having first and second ends, with an eye being formed at the first end. A bend arcuately extends from the second end of the shank and has at least first and second end portions and an intermediate portion. The first end portion of the bend is disposed at a predetermined angle from the axis of the shank to offset the intermediate portion to one side of the shank. A point is formed on the end of the second end portion of the bend and is rolled outward from the shank. The outer edge of the point has an arcuate shape disposed co-radially or concentrically with the first end portion of the bend. A barb is formed opposite from the point end has an outer edge facing the shank.

The keeling bend fly hook of the present invention includes an intermediate bend portion offset from the axis of the shank to create a keel action which ensures that the point of the hook rides in an upward position during reeling in of the hook. This presents the point in an ideal position for increased hook penetration. Further, the rolled-out point and the co-radial or concentric disposition of the point and the first end portion of the bend provides a large gap for easier penetration.

Further, the spear arrangement with the point rolled-out and the barb on the inside of the bend maximizes penetration and hook holding power as the point and the barb are imbedded in a fish in opposite directions.

In an alternate embodiment, usable with the keeling bend fly hook described above, a tubular, flexible body is mounted about the shank of the hook. An inverted, V-shaped, rigid insert is mounted within the body and over the shank of the hook. The insert has two depending legs having an exterior edge shape simulating the exterior shape of a shad-type bait fish. The legs expand the body to the same shape as the legs.

The tubular body may be provided in different attractor colors and, preferably, is formed of a translucent material. The insert is formed of a transparent material such that the combined tubular member and insert have a translucent appearance similar to that of a small bait fish.

When the tubular member and insert are employed on the keeling bend fishhook of the present invention, the legs of the V-shaped insert depend from one side of the shank, in the same direction as the first end portion and the intermediate portion of the bend portion of the hook. This places the tubular member in front of the keel portion of the hook so as not to interfere with the point which is disposed on the other side of the shank.

BRIEF DESCRIPTION OF THE DRAWING

The various features, advantages and other uses of the present invention will become more apparent by referring to the following detailed description and drawing in which:

FIG. 1 is a front elevational view of a prior art keel hook;

FIG. 2 is a front elevational view of one embodiment of the keeling bend fly hook of the present invention;

FIG. 3 is a front elevational view of another embodiment of the keeling bend fly hook of the present invention;

FIG. 4 is a front elevational view of a body constructed in accordance with the teachings of the present invention mounted on the fly hook shown in FIG. 3;

FIG. 5 is an exploded, perspective view of the body shown in FIG. 4; and

FIG. 6 is an end elevational view of the insert shown in FIG. 5.

DESCRIPTION OF THE PREFERRED EMBODIMENTS

Referring now to the drawing, and to FIG. 2, there is depicted a keeling bend fly hook constructed in accordance of the teachings of one embodiment of the present invention. The hook 10 may be formed of any suitable hook material, such as stainless steel, etc. Further, the hook 10, while being shown in a relatively large size in FIG. 2, may also be provided in other sizes, either smaller or larger than that depicted in FIG. 2.

The hook 10 includes an eye 14. The eye 14 may have any typical eye shape, such as ball, tapered looped, needle, brazed or flattened. In addition, the eye 14 may be provided in a number of different positions with respect to a shank 16, such as a ringed eye, a turned down eye or a turned up eye.

The shank 16 of the hook 10 has a first end 18 joined to and extending from the eye 14. The shank 16 and the eye 14 may be integrally formed as a continuous, unitary part of the hook 10. The shank 16 is linear or straight between the first end 18 and an opposed second end 20. The length of the shank 16 between the first and second ends 18 and 20, respectively, may be provided in any suitable length. However, it is preferred that the length of the shank 16 have a sufficient length so as to easily receive an attractor body or mass of buoyant material thereon, as described hereafter.

The hook 10 includes a bend 22 which extends continuously and preferably arcuately from the second end 20 of the shank 16. The bend 22 includes a first end bend portion 24 extending from the second end 20 of the shank 16, an intermediate bend portion 26, and a second end bend portion 28 which terminates in a point shown generally by reference number 50. According to a first embodiment of the present invention, the first end bend portion 24 is bent at a predetermined angle from the axis of the shank 16. In a preferred example, which is described as exemplary only, and not by way of limitation, the first end portion 24 of the bend 22, and, in particular, a chord line extending through the opposite ends of the first end portion 24 is disposed at an angle of approximately 33° from the axis of the shank 16. The first end portion 24 curves smoothly into the intermediate bend portion 26. Due to the angular disposition of the first end portion 24 of the bend 22 from the axis of the shank 16, the first end portion 24 and the intermediate portion 26 of the bend 22 are disposed offset to one side of the axis of the shank 16. This provide a keel shape, similar to the prior art keel hook shown in FIG. 1, which provides weight to one side of the shank 16 so as to dispose the point 50 of the hook 10 in an upward position during use of the hook 10, as described hereafter.

The second end portion 28 of the bend 22 extends continuously from the intermediate portion 26 of the bend 22. The point 50 is formed at the end of the second end portion 28. In the first embodiment shown in FIG. 2, the point 50 is formed as a rolled-out or bent-out point in which the tip 52 of the point 50 is bent out away from the shank 16.

Further, according to the present invention, the so-called "spear" portion of the hook which includes the point 50, a barb 54, and the second end portion 28 of the bend 22 is further bent-out from the shank 16. Preferably, the spear portion of the hook 10 is bent outward from the shank 16 until the spear portion including the second end portion 28 and the point 50 approaches a substantially parallel position with respect to the first end portion 24 of the bend 22. In this position, chord lines extending through each of the first and second end portions 24 and 28 are substantially parallel. This provides a sufficiently open gap for excellent raking penetration of the point 50 and hook retention.

The hook 10 may be fully dressed as a fly by mounting buoyant material, not shown, about the shank 16. The buoyant material may preferably be provided in an aerodynamic-shaped body formed of a suitable buoyant material, such as cork, STYROFOAM, etc. Feathers may be tied to the second end 20 of the shank 16 and extend outward therefrom around the hook 10. Preferably, the entire bend 22 in the hook 10 extends outward from the buoyant material or body.

Further details concerning the construction and mounting of the buoyant body on the shank 16 can be had by referring to U.S. Pat. No. 5,394,637, the contents of which are incorporated herein by reference.

The barb 54, which is formed on the second end bend portion 28 adjacent to the tip 52, extends exteriorly outward from the bend 22 away from the shank 16. This exterior or outward facing barb 54 provides increased holding power when a fish is hooked by the fly 10.

Referring now to FIG. 3, there is depicted another embodiment of the keeling bend fly hook 60 of the present invention. In this embodiment, the hook 60 is formed with an eye 64 and a shank 66 having a first end 68 and an opposed second end 70, as described above and shown in FIG. 2.

In this embodiment the fly hook 60 includes a keeling bend 72 formed of a first end portion 74 integrally joined to and extending from the second end 70 of the shank 66, an intermediate bend portion extending from one end of the first end portion 74 and a second end portion 78 extending from the intermediate portion 76.

A spear at the end of the second end portion 78 of the bend 72 includes a point 80 terminating in a tip 82. The point 80 is rolled-out or bent-out from the longitudinal axis of the shank 66.

According to a unique aspect of this embodiment the second end portion 78 of the bend 72 curves smoothly back toward the second end 70 of the shank 66. Further, the outer edge of the point 80 facing away from the shank 66 has an arcuate shape. The first end portion 74 of the bend 72 also has an arcuate shape. Preferably, the outer edge of the point 80 and the first end portion 74 of the bend 72 are disposed co-radially or concentrically with respect to each other from a common center, as shown in FIG. 3. This provides a large open gap for excellent hook penetration.

Further, a barb 84 is formed on the inside portion of the spear facing the shank 66. This places the barb 84 opposite from the outer edge of the point 80 so as to increase penetration and hook retention since the point 80 and the barb 84 will be imbedded in opposite directions in a hooked fish.

Further, the keeling bend arrangement of the hook 60 causes the point 80 to ride point up as the hook 60 is reeled in through the water. This places the point 80 in an ideal position for penetration and hooking of a fish.

Another aspect of the present invention is shown in FIGS. 4, 5 and 6. As shown therein, a hollow body 90 preferably formed of a translucent, flexible material, such as Mylar, has an initial, tubular shape as shown in FIG. 5. The tubular body 90 may be provided in a number of different colors, including colors with iridescent tints.

As shown in FIG. 5, the tubular body 90 is initially disposed over the shank 66 of the hook 60. One end of the body 90 is closingly secured to the second end 70 of the shank 66 by suitable means, such as by use of an adhesive, epoxy resin, etc., or simply by tying the end of the tubular member 90 in a closed manner to the second end 70 of the shank 66.

A rigid insert 92 is then slid into the open first end 91 of the tubular body 90. The insert 92 preferably has an inverted V-shape formed of two outwardly diverging, angularly disposed legs 94 and 96 which are interconnected at one end by a central edge 98. The insert 92 is preferably formed of a rigid plastic material which is ideally transparent for reasons which will become apparent hereafter.

Furthermore, an outer edge 100 of each of the legs 94 and 96 of the insert 92 has an arcuate shape, as shown in FIG. 5, which extends outwardly to a pronounced outermost surface 102 from the end disposed adjacent to the eye 64 of the shank 60 and then smoothly curves to the rear portion of the central edge 98 located adjacent to the second end 70 of the shank 66. This provides a simulated shad fish shape to the tubular body 90 when the insert 92 is mounted within the body 90. Since the insert 92 is preferably formed of a transparent material and the tubular body 90 is preferably formed of a translucent material, the shank 66 of the hook 60 will be visible through the side of the body 90 in the same manner as the spine of a small bait fish. This provides a more natural attraction or characteristic to the body 90 in that it more closely simulates a natural bait fish.

The first end 91 of the tubular member 90 is then securely closed about the first end 68 of the shank 66 by means of adhesive, epoxy resin, tying, etc.

When the body 90 is mounted on the shank 66, the outermost surfaces 102 of the insert 92 and the corresponding outer surface of the body 90 extend away from the shank 66 in the same direction as the first end portion 74 and the intermediate portion 76 of the keeling bend 72. This disposes the body 90 away from the point 80 so as not to interfere with the hooking of a fish.

In summary, there has been disclosed a unique keeling bend fly hook in which the rolled-out point and oppositely facing barb of the fly hook provide excellent raking penetration and hook retention in a fish due to the keeling bend action of the fly hook which causes the point to ride point up during movement of the fly hook in the water. A uniquely formed body is mounted on the shank of the keeling bend fly hook and is formed of a flexible material which is expanded to the shape of a shad type fish by means of a rigid insert mounted within the body and over the shank of the fly hook. The rigid insert is preferably formed of a transparent material which, in combination with the preferred translucent form of the tubular body, enables the shank of the keeling bend fly hook to be visible through the body in the same manner as the spine of a small bait fish to thereby provide a more natural appearing fly.

What is claimed is:

1. A fly hook comprising:

a shank having first and second ends;

a keel bend formed as an extension of the shank and having first and second end portions and an intermediate portion, the first end portion having an arcuate shape and disposed to one side of a longitudinal axis of the shank to position the intermediate portion of the bend from the longitudinal axis of the shank; and a point formed on an end of the second end portion of the bend, the point and at least a portion of the second end portion of the bend disposed on an opposite side of the longitudinal axis of the shank from the intermediate portion and the first end portion of the bend, the point rolled-out from the shank and terminating in a tip, a point edge extending from the tip to the second end portion of the bend having an arcuate shape, the second end portion of the bend positioning the point such that substantially all of the point edge is co-radially disposed with respect to the first end portion of the bend.

2. The fly hook of claim 1 further comprising:

a barb formed on the point and having an outer edge facing the shank.

3. The fly hook of claim 1 wherein:

the keel bend and the point are co-planar with the shank.

4. The fly hook of claim 1 further comprising:

a hollow tubular body formed of a flexible material mounted on the shank and having opposed ends closingly attachable to the shank; and a rigid member disposed within the body and having a shape to form the body to a predetermined bait fish shape.

5. A fly hook comprising:

a shank having first and second ends;

a keel bend formed as an extension of the shank and having first and second end portions and an intermediate portion, the first end portion having an arcuate shape and disposed to one side of a longitudinal axis of the shank to position the intermediate portion of the bend from the longitudinal axis of the shank;

a point formed on an end of the second end portion of the bend, the point rolled-out from the shank and terminating in a tip, a point edge extending from the tip to the second end portion of the bend having an arcuate shape, the second end portion of the bend positioning the point such that the point edge is co-radially disposed with respect to the first end portion of the bend;

a hollow tubular body formed of a flexible material mounted on the shank and having opposed ends closingly attachable to the shank;

a rigid member disposed within the body and having a shape to form the body to a predetermined bait fish shape, the rigid member formed as a V-shaped member having two angularly outward extending side legs connected at a common edge, the common edge disposed over the shank of the fly hook.

6. The fly hook of claim 5 wherein:

the side legs of the rigid member extend from the same side of the shank as the first end portion and the intermediate portion of the bend of the fly hook when the V-shaped member is mounted on the shank.

7. The fly hook of claim 5 wherein:

each of the legs of the V-shaped member are identically formed with first and second opposed ends and an outer edge surface, the outer edge having an arcuate shape with an outermost portion disposed closer to the first end than the second end, the outermost edge surface of each of the legs having a shape simulating a shad-type natural fish.

8. An artificial fly comprising:

a shank having first and second ends;

a keel bend formed as an extension of the shank and having first and second end portions and an intermediate portion, the first end portion having an arcuate shape and disposed to one side of a longitudinal axis of the shank to position the intermediate portion of the bend from the longitudinal axis of the shank;

a point formed on an end of the second end portion of the bend, the point and at least a portion of the second end portion of the bend disposed on an opposite side of the longitudinal axis of the shank from the intermediate portion and the first end portion of the bend, the point rolled-out from the shank and terminating in a tip, a point edge extending from the tip to the second end portion of the bend having an arcuate shape, the second end portion of the bend positioning the point such that the point edge is co-radially disposed with respect to the first end portion of the bend;

a hollow tubular body formed of a flexible material mounted on the shank and having opposed ends closingly attachable to the shank; and a rigid member disposed within the body to form the body to a predetermined bait fish shape. the common edge disposed over the shank of the fly hook.

9. The artificial fly of claim 8 further comprising:

a barb formed on the point and having an outer edge facing the shank.

10. The artificial fly of claim 8 wherein:

the keel bend and the point are co-planar with the shank.

11. An artificial fly comprising:

a shank having first and second ends;

a keel bend formed as an extension of the shank and having first and second end portions and an intermediate portion, the first end portion having an arcuate shape and disposed to one side of a longitudinal axis of the shank to position the intermediate portion of the bend from the longitudinal axis of the shank;

a point formed on an end of the second end portion of the bend, the point rolled-out from the shank and terminating in a tip, a point edge extending from the tip to the second end portion of the bend having an arcuate shape, the second end portion of the bend positioning the point such that the point edge is co-radially disposed with respect to the first end portion of the bend;

a hollow tubular body formed of a flexible material mounted on the shank and having opposed ends closingly attachable to the shank;

a rigid member disposed within the body to form the body to a predetermined bait fish shape, the rigid member formed as a V-shaped member having two angularly outward extending side legs connected at a common edge, the common edge disposed over the shank of the fly hook.

12. The artificial fly of claim 11 wherein:

the side legs of the V-shaped member extend from the same side of the shank as the first end portion and the intermediate portion of the bend of the fly hook when the V-shaped member is mounted on the shank.

13. The artificial fly of claim 11 wherein:

each of the legs of the V-shaped member are identically formed with first and second opposed ends and an outer edge surface, the outer edge surface having an arcuate shape with an outermost portion disposed closer to the first end than the second end, the outermost edge surface of each of the legs having a shape simulating a shad-type natural fish.

* * * * *